United States Patent [19]

Gianantonio et al.

[11] 3,886,154

[45] May 27, 1975

[54] METHOD FOR THE PREPARATION OF PHTHALAZINO (2,3-B) PHTHALAZINE-5(14H), 12(7H)-DIONE

[75] Inventors: Anacleto Gianantonio; Antonia Coco, both of Milan, Italy

[73] Assignee: Gruppo Lepetit S.p.A., Milan, Italy

[22] Filed: Apr. 18, 1974

[21] Appl. No.: 461,837

[30] Foreign Application Priority Data

Apr. 27, 1973 United Kingdom............... 20200/73

[52] U.S. Cl. ...... 260/250 P; 260/471 R; 260/518 R; 424/250
[51] Int. Cl............................................ C07d 51/06
[58] Field of Search................................ 260/250 P

[56] References Cited
UNITED STATES PATENTS
3,557,108   1/1971   Bellasio et al................... 260/250 P

OTHER PUBLICATIONS

Simpson, Condensed Pyridazine and Pyrazine Rings, Interscience, 1953, N.Y., p. 198.

Primary Examiner—Donald G. Daus
Assistant Examiner—Ralph D. McCloud
Attorney, Agent, or Firm—Theodore Post; C. Kenneth Bjork

[57] ABSTRACT

A method for preparing the anti-inflammatory substance, phthalazino[2,3-b]phthalazine-5(14H), 12(7H)-dione, through reducing with hydrogen and concomitantly cyclizing a compound selected from the group phthalaldehydic acid azine, a water-soluble salt or a lower alkyl ester of the said azine, 2-phthalidyl-1(2H)-phthalazinone or 2-(3-phthalimidinyl)-1(2H)-phthalazinone.

7 Claims, No Drawings

METHOD FOR THE PREPARATION OF PHTHALAZINO (2,3-B) PHTHALAZINE-5 (14H), 1 (7H)-DIONE

BACKGROUND OF THE INVENTION

Phthalazino[2,3-b]phthalazine-5(14H), 12(7H)-dione (hereinafter Compound) is a known compound which has been prepared by condensing 2-(bromomethyl)benzoyl chloride with 1,2-diacetylhydrazine in an anhydrous organic solvent in the presence of an organic nitrogen base. The resulting 2,3-diacetyl-3,4-dihydro-1(2H)-phthalazinone is hydrolized to the corresponding 3,4-dihydro-1-(2H)-phthalazinone. The latter is then reacted with 2-(bromomethyl)benzoyl chloride in the presence of an organic nitrogen base to give Compound; U.S. Pat. No. 3,557,108.

While the final step of U.S. Pat. No. 3,557,108 may be carried out on an industrial scale with quite satisfactory yields, the preparation of the intermediate 3,4-dihydro-1(2H)-phthalazinone in large amounts presents considerable difficulties and limits the overall yield. The object of this invention consists in providing a more useful new method for preparing Compound in amounts larger than laboratory amounts.

SUMMARY OF THE INVENTION

The process of this invention essentially consists in a reductive cyclization of the azine of phthaldehydic acid and its lower alkyl esters, I, or their transformation product, 2-phthalidyl-1(2H)-phthalazinone, II, according to the following scheme 1:

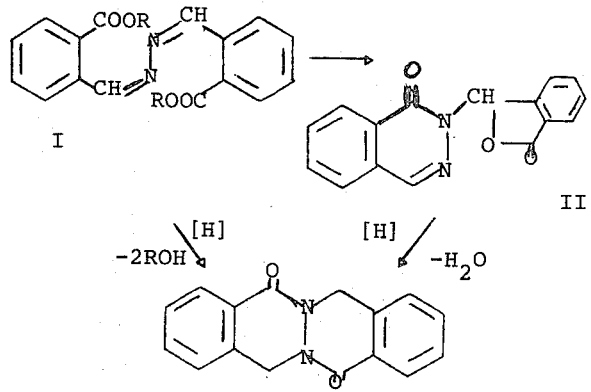

wherein

R represents H or lower alkyl. By "lower alkyl" is meant a 1 to 4 carbon atom alkyl group, e.g., a methyl, ethyl, propyl or butyl group.

The compounds of type I and II are known and can be prepared either by the procedures of S. Gabriel et al., Ber. 26, 521 (1893), or by the procedure of W. Griehl et al., Ber. 91, 1816 (1958).

More particularly, compounds of type II may be obtained either by heating azine I in acetic acid or in a dilute mineral acid, or by melting azine I, or via direct synthesis from 1(2H)-phthalazinone and phthalaldehydic acid. High yields are obtained in transforming compound I into compound II by using slightly different procedures from those described by W. Griehl, for instance, by heating compound I in an inert organic solvent in the presence of an acidic catalyst and azeotropically distilling off the water formed.

Pursuant to the process of the invention, the azine of phthalaldehydic acid may also be employed as a salt, preferably as the salt of a cation which imparts solubility in water, such as, for example, ammonium, lower alkyl ammonium, hydroxy-lower alkyl ammonium, $Na^+$, $K^+$, and the like, hereinafter "water-soluble salt."

Another compound which may be advantageously employed as the starting material instead of one of the compounds I and II is the -NH-isoster of 2-phthalidyl-1-(2H)-phthalazinone, i.e., 2-(3-phthalimidinyl)-1(2H)-phthalazinone (III) described by P. Lechat, Comptes Rendus 246, 2771 (1958).

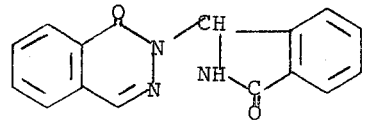

In this case, the reaction follows substantially the same scheme, the only difference being that ammonia is eliminated instead of water.

Reduction of one of the compounds I, II or III with concomitant cyclization to give Compound is carried out by using as a reducing agent (1) nascent hydrogen generated in the presence of a said compound by the reaction between a lower aliphatic carboxylic acid or, preferably, a mineral acid and a reactive metal such as aluminum, zinc or tin or (2) hydrogen gas, preferably at superatmospheric pressure, in the presence of a catalyst. Hereinafter, such reductions will be referred to sometimes as "reducinng with hydrogen" or "reduction with hydrogen."

When reduction with nascent hydrogen is utilized, the use of zinc in hydrochloric acid, sulfuric acid or acetic acid at a temperature ranging from about 10° to about 100°C. is particularly advantageous. The reaction is carried out by adding to a suspension of one of the starting compounds I, II or III in a selected acid, several portions of the selected metal, advantageously in the form of a thin foil, granule or powder with stirring, or by adding the acid to a suspension of the starting compound and of the metal reducer in water. The mixture is stirred at the desired temperature for 1 to 10 hours then, after cooling, is extracted with an organic solvent such as, for example, a lower halogenated hydrocarbon. Evaporation of the organic solvent, after washing with aqueous dilute alkali and drying, affords Compound. Pursuant to scheme 1, when the reaction is carried out starting with compound I, the treatment with an acid may favor the contemporaneous transformation of compound I to compound II. The latter compound, however, undergoes reductive cyclization under the same reaction conditions as compound I.

Catalytic reduction with hydrogen gas, the second alternative, is carried out at a temperature ranging from about 10° to about 200°C. at a pressure ranging from atmospheric pressure to about 60 atmospheres. Usually, the reduction medium employed is selected from water, the lower alkanols, acetic acid and aromatic hydrocarbons such as, for example, benzene, toluene and xylene, and the catalyst is selected from usual hydrogenation catalysts such as, for example, $PtO_2$, Pt, Pd, Ru, Rh, preferably adsorbed on a carrier, and Raney nickel.

The recovery of the final product, after filtration of the catalyst, is readily accomplished. The reaction mixture is cooled to allow crystallization or is evaporated to dryness to afford a residue which may be further purified by crystallization.

The use of acetic acid as the solvent for the catalytic hydrogenation reaction is particularly advantageous, since both starting compounds of types I and II can be directly prepared in situ from phthalaldehydic acid or a lower alkyl ester thereof, and hydrazine. Obviously, in the case of compound II, according to Griehl, it is necessary to keep the mixture at the boiling temperature for a longer time in order to transform the azine to the corresponding phthalidyl derivative.

The use of water as a solvent is particularly convenient where a water-soluble salt of the azine of phthalaldehydic acid is employed as the starting material. In this case, the salt may be directly formed in situ by dissolving the phthalaldehydic acid in an aqueous solution containing an excess of the compound which furnishes the cation such as, for instance, ammonium hydroxide, then treating the so-obtained aqueous solution with a stoichiometric amount of hydrazine.

The so-obtained solution is then submitted to catalytic hydrogenation pursuant to conditions described above. When the hydrogenation is carried out at a low temperature, such as, for instance, 10° to 50°C. at a pressure between atmospheric and 10 atmospheres, the hydrogenated solution, after filtration of the catalyst, is heated to about 60° to 100°C. or acidified to complete the cyclization. If the crude material obtained by acidification still contains some alkali-soluble uncyclized products such as, for instance, 1,2-bis(o-carboxybenzyl)-hydrazine, the cyclization may be completed by heating, preferably in a solvent such as, for instance, dioxane, acetic acid and dimethylformamide.

The following additional description and examples further describe the invention and the manner and process of making and using it to enable the art skilled to make and use the same and set forth the best mode contemplated by the inventors of carrying out the invention.

Example 1

2-Phthalidyl-1(2H)-Phthalazinone 50 grams of the azine of phthalaldehydic acid is heated for about 3 hours in toluene with one gram of p-toluenesulfonic acid as the catalyst. During the heating the water formed is distilled off azeotropically. By cooling the reaction mixture, the crystalline titular product is obtained, m.p. 225°–6°C., yield 43 g. (91 percent).

The following examples illustrate the preparation of Compound.

Example 2

A suspension of 15 g. of phthaldehydic acid azine in 100 ml. of acetic acid is hydrogenated in a bomb at 130°C. at a pressure of 20 atmospheres in the presence of 0.68 g. of 10 percent Pd adsorbed on charcoal. When the theoretical amount of hydrogen gas has been adsorbed, the hot solution is filtered and evaporated under vacuum. The residue obtained is crystallized from ethanol. Yield 10 g. (75 percent). By hydrogenating the azine of the methyl ester of phthalaldehydic acid (m.p. 133°–5°C.) pursuant to the same procedure, Compound is obtained in a 68 percent yield.

Example 3

A suspension of 11.15 g. of 2-phthalidyl-1(2H)-phthalazinone in 100 ml. of acetic acid is hydrogenated at 100°C. and at a pressure of 20 atmospheres in the presence of 0.55 g. of 10 percent Pd on charcoal. When the theoretical amount of hydrogen gas has been consumed, the hot solution is filtered and evaporated to dryness. The residue is dissolved in chloroform and the organic solution, after washing with aqueous $Na_2CO_3$ and with water, is evaporated, yielding 9.8 g. of Compound (87 percent). By using $PtO_2$ as the catalyst, 8.4 g. (80 percent) of Compound is obtained.

Example 4

A suspension of 28 g. of 2phthalidyl-1(2H)-phthalazinone in 200 ml. of acetic acid is hydrogenated at 80°C. and 10 atmospheres by using as a catalyst Adams platinum dioxide. Yield 19 g. (60 percent) of Compound.

Example 5

A suspension of 15 g. of 2-phthalidyl-1(2H)-phthalazinone in acetic acid is hydrogenated at 100°C. and 28 atmospheres using 10 percent Pd on charcoal as the catalyst. Yield 10 g. (80 percent) of Compound. A 61 percent yield of Compound is obtained by using Pt adsorbed on charcoal as the catalyst and ethanol as the solvent. A 70 percent yield of Compound is obtained when xylene is employed as the solvent.

Example 6

A suspension of 30 g. of 2-phthalidyl-1(2H)-phthalazinone in 500 ml. of acetic acid is hydrogenated at 80°C. at a pressure of 2.5 atmospheres in the presence of 1 g. of 10 percent Pd on charcoal. Yield 23 g. (81 percent). When the reaction is carried out at atmospheric pressure, the yield of Compound is 78 percent.

Example 7

To a suspension of 5.6 g. of 2-phthalidyl-1(2H)-phthalazinone and 18.3 g. of zinc powder in 50 ml. of water, 140 g. of 30 percent $H_2SO_4$ is added in 4 hours, keeping the temperature at about 90°C. When the addition is completed, the mixture is maintained at 90°C. for a further 2 hours. After cooling, the solid mass is extracted with chloroform and the organic solution, after washing with aqueous $Na_2CO_3$ and water, is evaporated. The residue is crystallized from ethanol. Yield 3.2 g. (60 percent). By following essentially the same procedure but adding 100 ml. of acetic acid instead of 140 g. of 30 percent sulfuric acid, Compound is obtained in an 80 percent yield.

Example 8

22 grams of phthalaldehydic acid azine is suspended in 50 ml. of $H_2O$. To this suspension, 450 g. of 30 percent $H_2SO_4$ is added with stirring. The mixture is heated at 90°C. and 60 g. of zinc powder is added in small portions. After about 2 hours at 90°C., the mixture is cooled and the crude precipitate is extracted with chloroform. After washing with aqueous $Na_2CO_3$ and water, the organic solution is evaporated. Yield 14 g. of Compound (72 percent).

Example 9

A suspension of 14 g. of 2-(3-phthalimidinyl)-1(2H)-phthalazinone in 100 ml. of acetic acid is hydrogenated at 90°C. and 15 atmospheres pressure in the presence of 5 percent Pd on charcoal. When the theoretical amount of hydrogen gas is consumed, Compound is recovered according to the same procedure as in Example 3. Yield 9 g. (57 percent).

Example 10

A suspension of phthalaldehydic acid azine (obtained by adding to 25 g. of phthalaldehydic acid dissolved in 200 ml. of acetic acid, 4 g. of 98 percent hydrazine hydrate at room temperature) is hydrogenated at atmospheric pressure in the presence of one g. of 10 percent Pd on charcoal. The temperature during the hydrogenation is maintained between 25° and 30°C. when the theoretical amount of hydrogen gas is consumed, the mixture is concentrated to a volume of about 80 ml. and the precipitate which forms on cooling is recovered on a filter. Yield of Compound 15.4 grams (70 percent).

Example 11

To a solution of 14 g. of phthalaldehydic acid in 100 ml. of acetic acid, 2 g. of 98 percent hydrazine hydrate is added. The mixture is refluxed for 20 minutes, then hydrogenated at 100°C. and 40 atmospheres pressure in the presence of 4 g. of Raney nickel. Yield of Compound 8 g. (76 percent). Alternatively, the hydrogenation may be carried out with 5 percent Rh on charcoal as the catalyst at 60°C. and 30 atmospheres with a 68 percent yield of Compound.

Example 12

To a solution of 48 g. of phthalaldehydic acid in 500 ml. of 15 percent ammonium hydroxide, 8.2 g. of 98 percent hydrazine hydrate in 40 ml. of water is added at 20°C. After addition of 5 g. of 5 percent Pd on carbon, the mixture is hydrogenated at 25°C. and atmospheric pressure. After filtration of the catalyst, the solution is acidified with hydrochloric acid and the crude product which precipitates is collected on a filter and purified by extraction with hot dioxane. By cooling the organic extract, 32 g. (76 percent) of Compound is recovered. Alternatively, the solution after filtration of the catalyst may be refluxed without acidification. The product which precipitates on cooling is collected on a filter and purified by crystallization. Yield of Compound 65 percent.

What is claimed is:

1. A process for preparing phthalazino[2,3-b]-phthalazine-5(14H), 12(7H)-dione of the formula

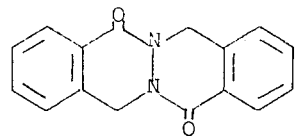

which comprises the step of reducing with hydrogen in the presence of a hydrogenation catalyst at up to 60 atmospheres pressure or in nacscent form and concomitantly cyclizing a compound selected from the group consisting of phthalaldehydic acid azine, a water-soluble salt or a lower alkyl ester of the said azine, 2-phthalidyl-1(2H)-phthalazinone or 2-(3-phthalimidinyl)-1(2H)-phthalazinone.

2. A process as claimed in claim 1, wherein the reductive cyclization reaction is carried out with hydrogen gas in the presence of a catalytic amount of a catalyst selected from the group consisting of Pt, Pd, Rh, Ru, $PtO_2$ and Raney nickel at a temperature from about 10° to about 200°C. at a pressure ranging from atmospheric pressure to about 60 atmospheres.

3. A process as claimed in claim 1, wherein the reductive cyclization is carried out with nascent hydrogen generated by reaction between a lower aliphatic carboxylic acid or a strong mineral acid and a metal selected from the group consisting of zinc, tin or aluminum at a temperature between about 10° and about 100°C. in the presence of a said compound.

4. A process as claimed in claim 1, wherein the reductive cyclization is carried out in the presence of a solvent selected from the group consisting of lower aliphatic carboxylic acids, benzene, toluene, xylene, lower alkanols and water.

5. A process as claimed in claim 1, wherein the compound which is reduced and cyclized is selected from the group consisting of phthalaldehydic acid azine, its water-soluble salts and its lower alkyl esters.

6. A process as claimed in claim 1, wherein the compound which is reduced and cyclized is 2-phthalidyl-1(2H)-phthalazinone.

7. A process as claimed in claim 1, wherein the compound which is reduced and cyclized is 2-(3-phthalimidinyl)-1-(2H)-phthalazinone.

* * * * *

UNITED STATES PATENT OFFICE
CERTIFICATE OF CORRECTION

PATENT NO. : 3,886,154
DATED : May 27, 1975
INVENTOR(S) : Anacleto Gianantonio and Antonio Coco It is certified that error appears in the above-identified patent and that said Letters Patent are hereby corrected as shown below:

Page 1, second line of the title, "(2,3-B)" should read -- (2,3-b) --.

Page 1, Inventors, end of first line, "Antonia" should read -- Antonio --.

Page 2, column 1, second line of the title, "(2,3-B)" should read -- (2,3-b) --;

column 1, third line of the title, "1 " should read -- 12 --.

Page 2, column 2, line 29, "'reducinng" should read -- "reducing --.

Page 3, column 4, line 11, "2phthalidyl-1(2H)-" should read -- 2-phthalidyl-1(2H)- --.

Page 4, column 5, line 11, "when" should read -- When --.

Signed and Sealed this twenty-third Day of September 1975

[SEAL]

Attest:

RUTH C. MASON
Attesting Officer

C. MARSHALL DANN
Commissioner of Patents and Trademarks